May 30, 1950 A. R. GOLRICK 2,509,682
PALLET
Original Filed Dec. 1, 1943
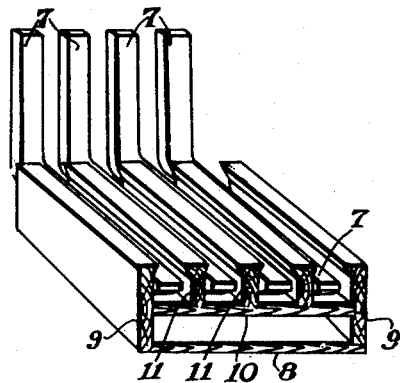
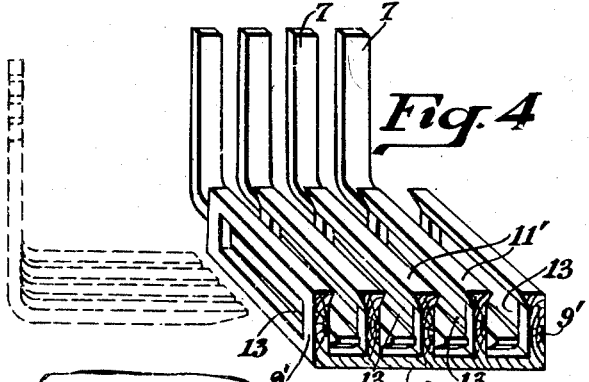
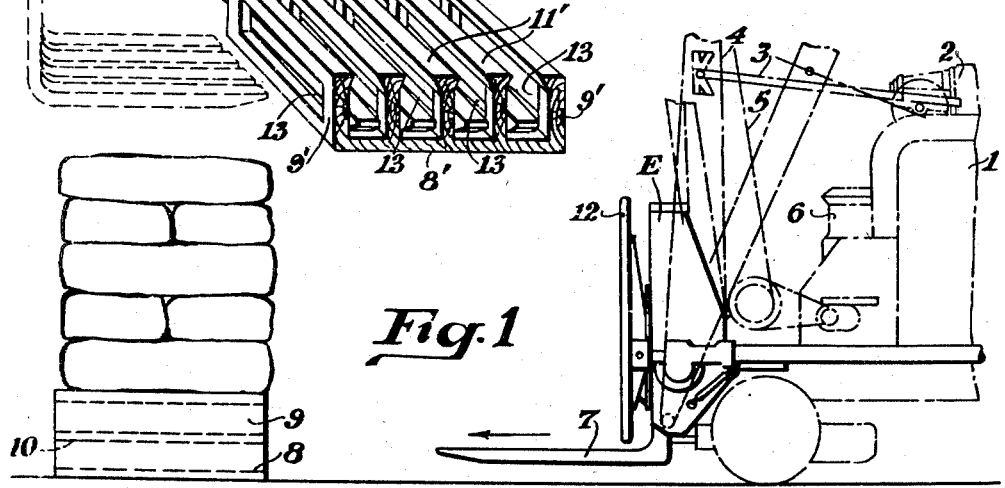
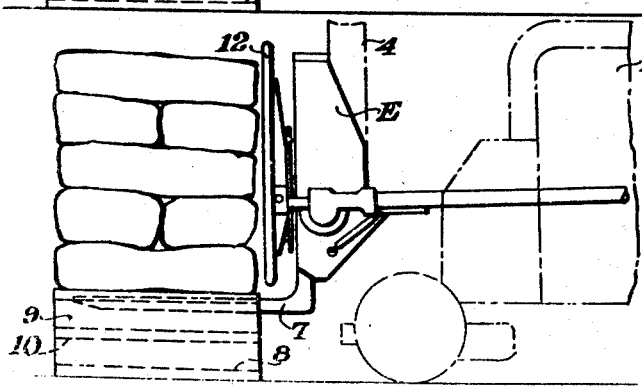
INVENTOR.
ALBERT R. GOLRICK.
BY- Jay, Golrick & Jay
Attorneys

Patented May 30, 1950

2,509,682

UNITED STATES PATENT OFFICE 2,509,682

PALLET

Albert R. Golrick, Cleveland Heights, Ohio, assignor to Sheldon K. Towson, Shaker Heights, Ohio Original application December 1, 1943, Serial No. 512,416. Divided and this application January 10, 1947, Serial No. 721,258

3 Claims. (Cl. 248—120)

This invention relates to means for handling tiered loads by an industrial truck equipped with a fork type load carrying and elevating mechanism, and more particularly to a pallet or skid upon which a tiered load may be supported and carried by the truck. The present application is a division of my copending application Serial Number 512,416, filed December 1, 1943, now abandoned.

In the handling of loaded pallets or skids by industrial lift trucks and the like, it frequently becomes necessary, particularly in connection with tiered loads such as piles or stacks of bags filled with bulk material, for example, to transfer the load from the pallets or skids to the elevator of the truck in order to permit the load, without the pallet, to be deposited on the floor of a freight car, for example, or upon a previously-deposited load.

Various methods and means have been proposed for accomplishing this. In some cases, mechanism or means for holding the pallet or skid while stripping the load therefrom was incorporated in the truck, but this was not entirely satisfactory, since the incorporation of such pallet-holding means in the truck required space therefor where space was at a premium, and the mechanism was so located as to make somewhat difficult access thereto for repair or replacement.

In United States Patents Nos. 2,394,692 and 2,394,695, methods of handling such tiered loads are described, in which the use of mechanism on the truck for retaining or holding the pallet is obviated, but in which stationary or movable abutments independent of the truck are provided against which the load is initially moved, the load being then transferred to the load-engaging prongs of the truck elevator.

The present invention has for its primary object the provision of a pallet, or skid, by which the tiered load thereon may be transferred therefrom to the load supporting fork type elevator of an industrial lift truck without the use of pallet retaining or holding mechanism on the truck, or the use of abutments of the character referred to.

Another object of the invention is to provide a pallet for tiered loads constructed so that the pallet can be engaged by the prongs of the elevator of the industrial truck for lifting and carrying the load while it is stacked on the pallet, or the load may be removed from or deposited on the pallet by the prongs of the elevator.

Other objects and advantages of the invention will be apparent during the course of the following detailed description of preferred forms of the invention, reference being made to the accompanying drawings wherein:

Fig. 1 is a side view pallet supporting a tiered load and an industrial truck approaching the pallet;

Fig. 2 is a view similar to that of Fig. 1, but showing the prongs of the elevator of the truck about to remove the tiered load from the pallet;

Fig. 3 is a perspective view of the pallet shown in Figs. 1 and 2 with the elevator of the truck in the position to transfer the load from the pallet to the prongs;

Fig. 4 is a perspective view of a modified form of pallet and elevator of the truck; and Fig. 5 is an end view of still another form of pallet, which pallet is shown supporting a tiered load, and the elevator of a truck being shown about to remove the load from the pallet.

Referring to Figs. 1 to 3 of the drawings, it will be seen that an industrial truck, such as is best adapted for use in the practice of the method of the present invention, generally comprises a battery 1 which is used to furnish power for a motor 2, which, through racks 3, functions to tilt a frame 4 to various positions, as indicated in Fig. 1. The frame comprises spaced channels having filler strips which serve as tracks or guides for the wheels of a vertically-reciprocable elevator, generally designated E.

The elevator is propelled up or down along the frame 4 by means of a cable or chain 5, the ends of which are attached in any suitable manner to the elevator E, such chains or cables being driven by a motor 6, which derives its motive power from the battery 1.

The elevator E is in the form of a fork provided with a plurality of laterally spaced prongs or tines 7, which are spaced sufficiently together to readily adapt them for collectively supporting a tiered load of the character hereinbefore described. These prongs, moreover, are well-adapted for supporting a skid, or pallet, which, as shown in Fig. 3, is of a special construction, consisting of a bottom member 8, sides 9, a partition 10 which is substantially parallel with the bottom and interconnects the sides 9, and a series of upstanding members 11 which are spaced to correspond with the spacing of the prongs 7, extend upwardly from the partition 10 and are substantially parallel with the sides 9. The sides 9 as well as the members 11 are flared at their upper ends to provide broadened surfaces for better supporting a tiered load. These surfaces may be of any desired width, subject, however, to the limitation that the spaces between such surfaces, must, for the purposes of the invention, be at least slightly wider than the width of the prongs 7. The pallet, as thus described, may be made of wood or other suitable material.

The truck further includes a pusher or screen 12, which is mounted on the elevator E and is reciprocable relatively to such elevator, being substantially coextensive in width with the elevator. The construction of this pushed and the mechanism for reciprocating the same relatively to the elevator are fully described in the patent to Henry F. Wilms, No. 2,371,661, and need not therefore be here described.

The use of the invention may be briefly described as follows:

The units of the load will first be stacked upon the surfaces formed by the upper ends of the sides 9 and members 11 of the pallet to form the tiered load, as shown in Fig. 1 of the drawings. The operator will then move the truck in the direction indicated by the arrow in Fig. 1, and operate the elevator in such a manner as to cause the prongs 7 to enter the space formed by the bottom 8, sides 9 and partition 10 of the pallet, thereafter actuating the elevator to cause the prongs to engage the lower surface of the partition 10, and elevate the load to a transportable position, after which the load may be moved to any desired point at which the load is to be deposited.

If the operator wishes merely to deposit the load with the pallet, he will lower the elevator until the bottom of the pallet engages the surface upon which the pallet is to be deposited, and, after the prongs are clear of engagement with the lower surface of the partition 10, will cause the truck to recede from the pallet.

Should the operator, however, wish to transport the load into a freight car, it is desirable that the load be deposited without the pallet which bears the load. For this purpose, the operator, after he has caused the truck to recede from the pallet, as above described, will operate the truck in such a manner as to cause the prongs to enter the spaces between the upright members 11 and the spaces between such members and the sides 9 of the pallet, as shown in Figs. 2 and 3, to thereby position the prongs under the load. He will then actuate the elevator to cause the prongs to directly engage the bottom of the load and then lift the load from the pallet to a transportable position, after which the load, minus the pallet, may be moved into the freight car or other final unloading position. The operator can then discharge or strip the load from the prongs by means of the pusher 12, thereby depositing the load on the floor of the car or on a previously deposited load.

The method thus involves three distinct steps, stages, or phases, (1) the elevation of the pallet bearing the tiered load by means of the prongs of the lift truck, (2) the elevation of the load itself by means of such prongs, and (3) the stripping of the load from the prongs by means of the pusher or other pushing force transversely applied to the load. The method, it may be noted, avoids the use of pallet-retaining or holding mechanism or hooks, as well as the use of abutments or other mechanism independent of the truck, such as hereinbefore referred to.

In some cases, it is desirable to restrict the overall height of the pallet, and for this purpose, a modified form of pallet such as shown in Fig. 4 of the drawings may be used. Such pallet comprises a bottom 8', sides 9' and a series of upstanding members 11', which are spaced to correspond with the spacing of the prongs 7 of the truck, extend upwardly from the bottom 8' and are substantially parallel with the sides 9'. The sides 9', as well as the members 11' are flared at their upper ends to provide broadened surfaces for better supporting a tiered load. The sides 9', as well as the members 11' are also provided with rectangular openings 13 which are in alignment or registration with each other.

In the use of the modified form of pallet, the units of the load will first be stacked upon the surfaces formed by the members 9' and 11' of the pallet to form the tiered load. The operator will then operate the truck in such a manner as to cause the prongs 7 to enter the aligned openings 13, actuate the elevator to cause the prongs to engage the upper walls of these openings, and elevate the pallet to a transportable position, after which the load may be moved to any desired point and the load deposited with the pallet. The operator will then cause the truck to recede from the pallet, and will operate the truck in such a manner as to cause the prongs to enter the space between the upright members 11' and between such members and the sides 9' of the pallet, to thereby position the prongs under the load. He will then actuate the elevator to cause the prongs to directly engage the bottom of the load, lift the load from the pallet to a transportable position and then move the load into a freight car and deposit it in the manner already described in connection with the first form of pallet.

If desired, the pallet shown in Fig. 3 may be modified in the manner shown in Fig. 5 by the omission of the bottom 8, or by omitting the bottom 8 and providing a construction below the partition 10 which duplicates that above such partition, providing, in effect, a reversible pallet.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A load transporting pallet for use with a lifting fork type industrial truck comprising a unitary channeled structure having a top load bearing portion and a bottom floor bearing portion, said channeled structure having means disposed intermediate the said top and bottom portions to afford pallet lifting engagement of the forks thereby to raise the pallet with the load thereon and the channeled structure being such that the width and depth of the channels are greater than the width and thickness of the fork tines to provide for a second insertion of the tines between the underside of a load disposed on said pallet top portion and the means affording said pallet lifting engagement whereby the load can be transferred from the pallet directly to the forks by an elevating movement of the forks.

2. A load transporting pallet for use with a lifting fork type industrial truck comprising a unitary channeled structure having a top load bearing portion and a bottom floor bearing portion, said channeled structure comprising side walls having upper and lower edges, a horizontal wall extending between the side walls and intermediate said upper and lower edges thereof to provide means to afford pallet lifting engagement of the forks thereby to rise the pallet with the load thereon, and spaced upstanding longitudinally extending walls on said horizontal wall forming channels above the horizontal wall to provide for a second insertion of the tines into the channels between the load disposed on the top edges of said pallet and the horizontal wall whereby the load can be transferred from the pallet directly to the forks by an elevating movement of the forks.

3. A load transporting pallet for use with a lifting fork type industrial truck comprising a unitary channeled structure having a top load bearing portion and a bottom floor bearing portion, said channeled structure comprising a bottom wall and longitudinally extending vertical side walls, upstanding walls between the side walls and extending parallel thereto in spaced relation to provide channels for receiving the tines of the fork whereby the load may be lifted from the pallet by elevating movement of the forks, said side walls and upstanding walls being provided with apertures to provide for a second insertion of the tines therethrough to engage the same with the pallet and lift the same with the load thereon upon elevation of the forks.

ALBERT R. GOLRICK.

REFERENCES CITED

The following references are of record in the file of this patent:

UNITED STATES PATENTS

| Number | Name | Date |
|---|---|---|
| 699,475 | Bechtel | May 6, 1902 |
| 1,271,413 | Allen | July 2, 1918 |
| 1,922,560 | Sullivan | Aug. 15, 1933 |
| 2,412,184 | Ulinski | Dec. 3, 1946 |